March 26, 1957     J. D. BROWN     2,786,505
MEAT CHOPPING DEVICE WITH IMPROVED CHOPPER BARREL
Filed Jan. 8, 1954     2 Sheets-Sheet 1
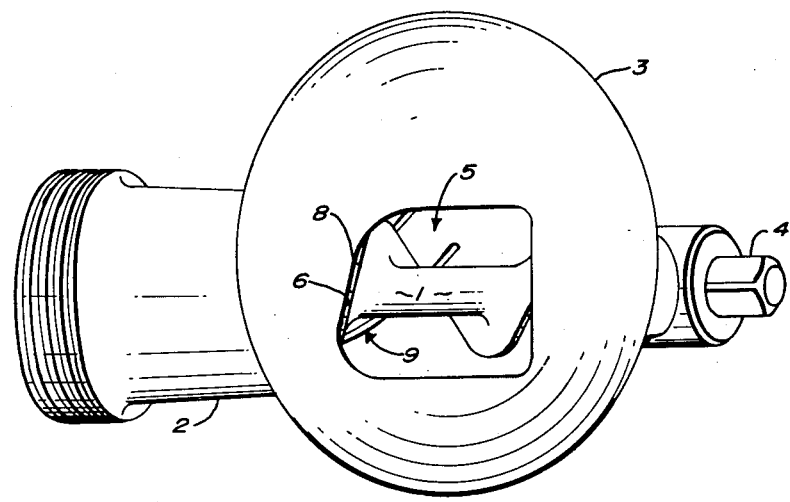
Fig. II
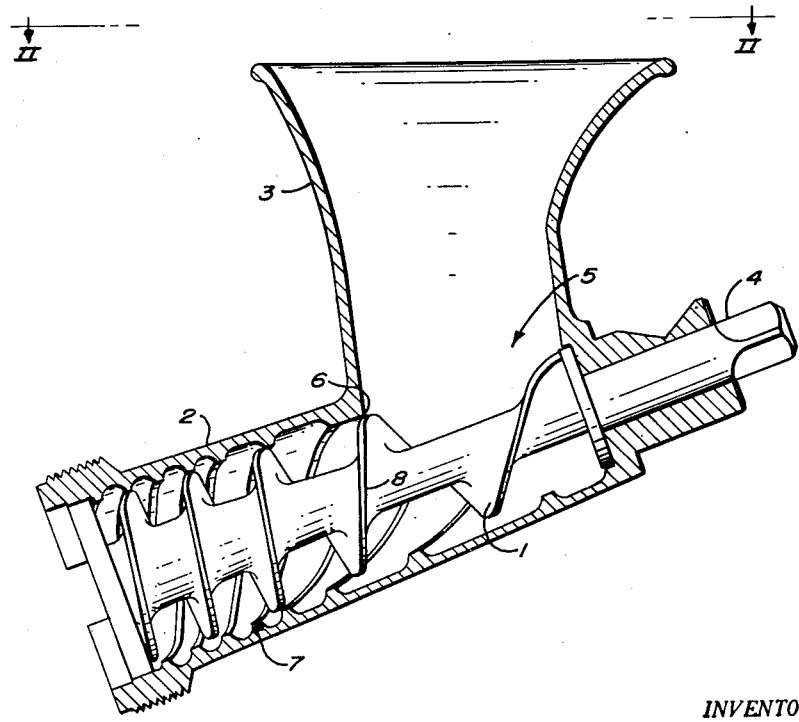
Fig. I
INVENTOR.
JAMES D. BROWN
BY
Marshall, Marshall & Yeasting
ATTORNEYS

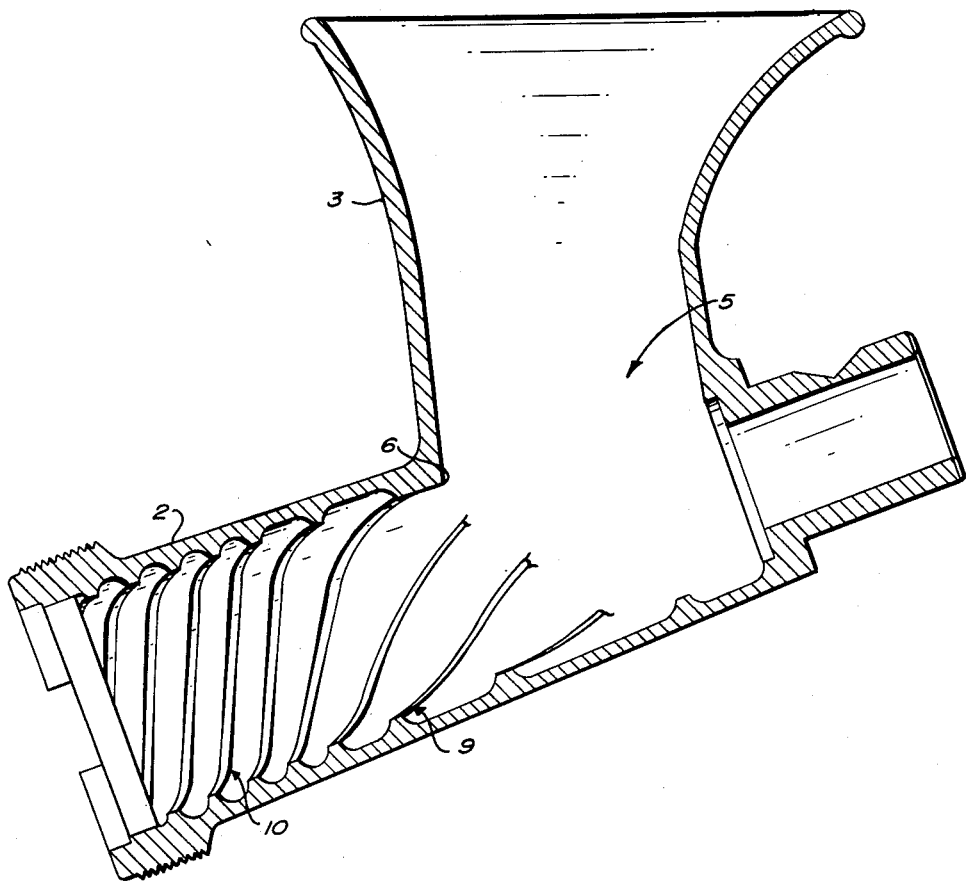
Fig. III
INVENTOR.
JAMES D. BROWN

United States Patent Office

2,786,505
Patented Mar. 26, 1957

2,786,505

MEAT CHOPPING DEVICE WITH IMPROVED CHOPPER BARREL

James D. Brown, Toledo, Ohio, assignor to Toledo Scale Company, Toledo, Ohio, a corporation of New Jersey Application January 8, 1954, Serial No. 402,973

5 Claims. (Cl. 146—182)

This invention relates to machines for comminuting food and in particular to improved means for increasing the output of a commodity comminuted by such a machine.

Machines for comminuting food are usually equipped with a single feeding worm which extends through a cylindrical hollow feeding barrel having fluted walls. The food is inserted into one end of the feeding barrel and rotation of the feeding worm on its longitudinal axis feeds it through the feeding barrel and against a perforated plate which closes the other end of the feeding barrel. The pressure exerted on the food by the feeding worm forces it against the face of the perforated plate and causes small protuberances of food to extend into the perforations. A rotary knife, mounted on the end of the feeding worm, revolves cutting off small nodules of food.

In order to thoroughly chop food, such as meat, it usually is fed through the machine a second time. In the first chopping, since the meat being fed is in relatively large lumps, the friction producing action of the flutes will cause pressure to impart a fairly positive feed. However, on the second cut the meat is already chopped into quite small particles and is in somewhat mushy condition. It is normally assumed that the once-ground meat will be easily transported through the machine the second time. This, however, is not the case. The feeding worm, which will easily transport the unground meat during the first grinding, cannot transport ground meat without difficulty, and for this reason the second grinding requires substantially more time than the first grinding.

Heretofore, the mushy nature of the ground meat during a second grind created a back pressure in the feeding barrel which pushed some of the meat back through the generally round or oval ingress opening through which the meat was fed. The round or oval shape of the opening permitted the meat to be pushed back through the opening. This regurgitation effect decreased the output of meat comminuted by the machine and made the meat difficult to feed into the machine. Furthermore, the feeding barrels in prior art devices were constructed with spiral flutes having a decreasing pitch or a constant pitch over the entire length of the barrel. Such a decreasing pitch in the spiral flutes over the entire length of the barrel resulted in a pressure at the discharge end of the barrel which was not constant resulting in turn in non-uniform nodules of comminuted meat; such a constant pitch in the spiral flutes over the entire length of the barrel resulted in an undesirable high pressure in the feeding barrel at the ingress opening resulting in turn in adding to the regurgitation effect.

The principal object of this invention is to provide, in a machine for comminuting food, means for producing a high rate of second grind.

Another object is to provide, in a machine for comminuting food, means for rapidly producing uniform, coarse once-ground material and uniform, fine twice-ground material.

Another object is to provide means for substantially eliminating the regurgitation effect of back pressure which often builds up in a machine for comminuting food.

Another object is to provide a machine for comminuting food which permits easy and rapid feeding of the material to be comminuted.

Other objects and advantages will be apparent from the following description in which reference is had to the accompanying drawings.

According to the invention, as a commodity is fed into a feeding barrel through an ingress opening, a feeding worm is rotated to carry the commodity through the feeding barrel to a discharge end of the barrel where the commodity is comminuted. A spiral flute formed integrally with the inner surface of the feeding barrel assists the feeding worm which spiral flute has a decreasing pitch over a portion of its length from the ingress opening towards the discharge end of the feeding barrel and a constant pitch over the rest of its length for forming a pressure gradient in the feeding barrel ending in a high uniform pressure at the discharge end. The pressure gradient allows the commodity to be fed easily and rapidly into the machine. The high uniform pressure at the discharge end rapidly produces uniform, coarse once-ground material and uniform, fine twice-ground material. The uniformity in size of the nodules of comminuted material depends upon such uniform pressure. The pressure gradient ending in a high uniform pressure at the discharge end provides in particular a very high rate of second grind and produces a very uniform product.

A throat is provided having a front edge at the intersection of the ingress opening and the feeding barrel on the side of the throat toward the discharge end of the feeding barrel, the front edge being at an angle substantially the same as the pitch of the spiral rib on the feeding worm coacting with the front edge. The combination of the pressure gradient ending in a high uniform pressure at the discharge end of the feeding barrel and the peculiarly shaped throat substantially eliminates the regurgitation effect of back pressure which often builds up in feeding barrels, permits easy and rapid feeding, and provides a rapid uniform drive through the feeding barrel to increase the output of the machine and the uniformity of the product, and in particular the output and uniformity of the second grind.

In the drawings:

Figure I is a fragmentary vertical sectional view taken along the longitudinal axis of Figure II showing a chopping mechanism embodying the invention.

Figure II is a plan view of the mechanism shown in Figure I, and is taken substantially along line II—II of Figure I.

Figure III is an enlarged view of the feeding barrel shown in Figure I.

These specific figures and the accompanying description are intended merely to illustrate the invention but not to limit its scope.

Referring to Figure I, a feeding worm or feed screw 1 is rotatably mounted in a feeding barrel or chopper cylinder 2 to carry a commodity fed into a feeding chamber 3 toward a discharge end of the feeding barrel 2 where the commodity is comminuted. The feeding worm 1 is provided with a squared end 4 which engages with drive means adapted to rotate the feeding worm. The feeding barrel 2 and the feeding worm 1 located therein are inclined slightly to the horizontal. The feeding chamber 3 is preferably formed integrally with the feeding barrel 2 and stands vertically thereon.

The driving means for the feeding worm 1 and the means by which the chopping mechanism may be mounted on a chopping machine are not shown. Any type of drive means may be employed with the instant invention.

A throat 5 is formed at the intersection of the feeding chamber 3 and the inclined feeding barrel 2. From above, the throat 5 appears to have two sides which are parallel to the axis of the feeding worm 1, a rear edge connecting the two sides which rear edge is transverse to the axis of the feeding worm, and a front edge 6 which is angular with respect to the sides of the throat 5. The corners of the throat are rounded slightly to provide a smooth surface to facilitate feeding and cleaning of the device.

Spiral flutes 7 are formed integrally with the inner surface of the feeding barrel 2 to assist the feeding worm 1 and spiral ribs 8 are formed on the feeding worm for feeding food through the barrel. A portion of the rib 8 is adapted, as the feeding worm 1 is rotated, to engage with the front edge 6 of the throat to shear off some of the commodity being fed into the feeding chamber 3. That portion of the spiral rib 8 on the feeding worm which engages with the front edge 6 of the throat is parallel to the front edge 6 when the feeding takes place.

By providing such an ingress opening from the feeding chamber 3 into the feeding barrel 2, a back pressure which may have been built up in the barrel 2 is not able to push the material back through the opening. Instead, that back pressure will tend to increase the output of the material chopped at the discharge end of the barrel. Prior art devices having round, oval, or otherwise symmetrically shaped throats or openings were limited in the ease and speed of feeding and in output of commodity chopped since the commodity often would move back out through the throat of the feeding chamber.

The spiral flute 7 has a decreasing pitch 9 over a portion of its length from the ingress opening of the feeding chamber 3 into the feeding barrel 2 towards the discharge end of the feeding barrel and a constant pitch 10 over the rest of its length for forming a pressure gradient in the feeding barrel ending in a high uniform pressure at the discharge end. The pressure gradient, which begins with a low pressure near the throat 5, allows the commodity to be fed easily and rapidly into the machine. The pressure gradient, which ends in a high uniform pressure at the discharge end of the feeding barrel, also greatly aids in rapidly producing uniform, coarse, once-ground material and uniform, fine twice-ground material.

The combination of the lower pressure in the feeding barrel 2 near the throat 5 and the peculiar shape of the throat 5 permits the commodity to be fed easily and rapidly into the machine and prevents back pressure which may have been built up in the feeding barrel 2 from pushing the commodity back through the ingress opening. The combination of the high uniform pressure in the feeding barrel 2 near the discharge end of the barrel and the peculiar shape of the throat 5 provides a rapid drive through the feeding barrel without a regurgitation effect to increase the output of the machine and the uniformity of the product and in particular the output and uniformity of the second grind.

Various changes may be made in the details of construction without departing from the spirit and scope of the invention.

Having described the invention, I claim:

1. A feeding barrel for a machine for comminuting food having a feeding worm rotatably mounted in said barrel for feeding food therethrough, an ingress opening leading into said barrel, and a spiral flute formed integrally with the inner surface of the feeding barrel to assist the feeding worm, said spiral flute having a decreasing pitch over a portion of its length from the ingress opening towards the discharge end of the feeding barrel and a constant pitch over the rest of its length for forming a pressure gradient in the feeding barrel ending in a high uniform pressure at the discharge end.

2. In a machine for comminuting food having a feeding barrel, an ingress opening leading into said barrel, and a feeding worm rotatably mounted in said barrel, in combination, a spiral rib on the feeding worm for feeding food through the barrel, a throat having a front edge at the intersection of the ingress opening and the feeding barrel on the side of the throat toward the discharge end of the feeding barrel, said front edge being at an angle substantially the same as the pitch of the spiral rib on the feeding worm coacting with the front edge and said front edge being at an acute angle to a side of said feeding barrel for minimizing the regurgitation effect of back pressure in the feeding barrel, and a spiral flute formed integrally with the inner surface of the feeding barrel to assist the feeding worm, said spiral flute having a decreasing pitch over a portion of its length from the ingress opening towards the discharge end of the feeding barrel and a constant pitch over the rest of its length for forming a pressure gradient in the feeding barrel ending in a high uniform pressure at the discharge end.

3. In a machine for comminuting food having a chopper cylinder and a feed screw having a spiral rib for carrying food through the chopper cylinder, in combination, a downwardly inclined ingress opening having a throat opening into said chopper cylinder, said throat having its front edge directed at substantially the same angle as the portion of the spiral rib on the screw which coacts with that edge of the throat and having its front edge directed at an acute angle to a side of the chopper cylinder, and a spiral flue formed integrally with the inner surface of the feeding barrel to assist the feed screw, said spiral flute having a decreasing pitch over a portion of its length from the ingress opening towards the discharge end of the chopper cylinder and a constant pitch over the rest of its length.

4. The combination according to claim 3 wherein the throat has two sides which are parallel to the axis of the feed screw and a front edge at the point of intersection of the ingress opening and the chopper cylinder which front edge is angular with respect to the parallel sides of the throat, said front edge being at substantially the same angle as that portion of the spiral rib on the feed screw cooperating with the front edge and said front edge being at an acute angle to a side of said chopper cylinder.

5. A chopper barrel for a machine for comminuting food having a spiral flute formed integrally with the inner surface of the chopper barrel, said spiral flute having a decreasing pitch over a portion of its length remote from the discharge end of the chopper barrel and a constant pitch over the rest of its length.

References Cited in the file of this patent

UNITED STATES PATENTS

| | | |
|---|---|---|
| 482,146 | Woodruff | Sept. 6, 1892 |
| 1,889,688 | Middleton | Nov. 29, 1932 |
| 2,181,780 | Brown | Nov. 28, 1939 |
| 2,655,967 | Mallory | Oct. 20, 1953 |